March 22, 1949.  A. H. LEWIS ET AL  2,464,875
CHAIN WELDING AND CHAIN WELDING MACHINE
Filed March 21, 1947  9 Sheets-Sheet 1
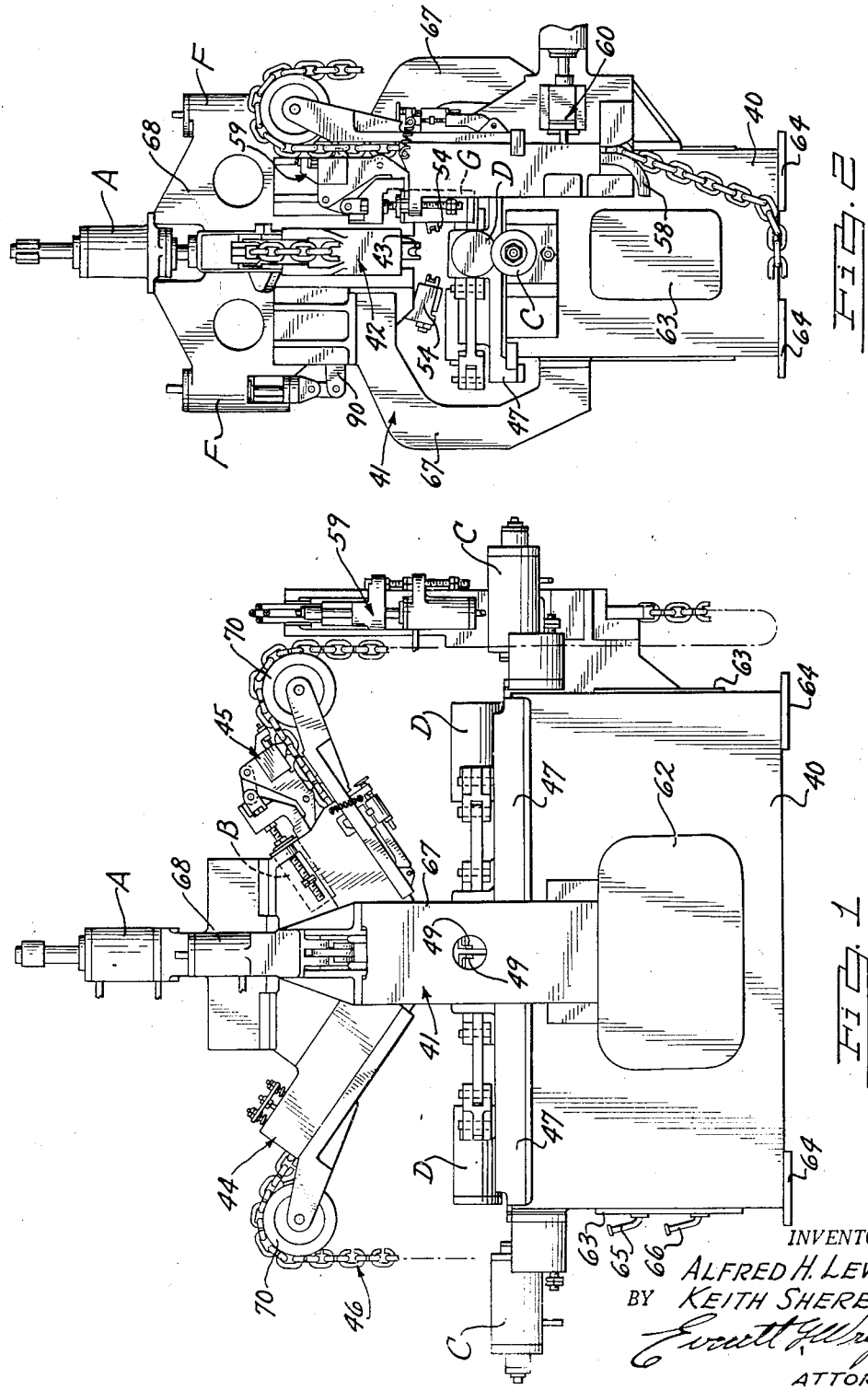
INVENTORS
ALFRED H. LEWIS &
BY KEITH SHEREN
ATTORNEY

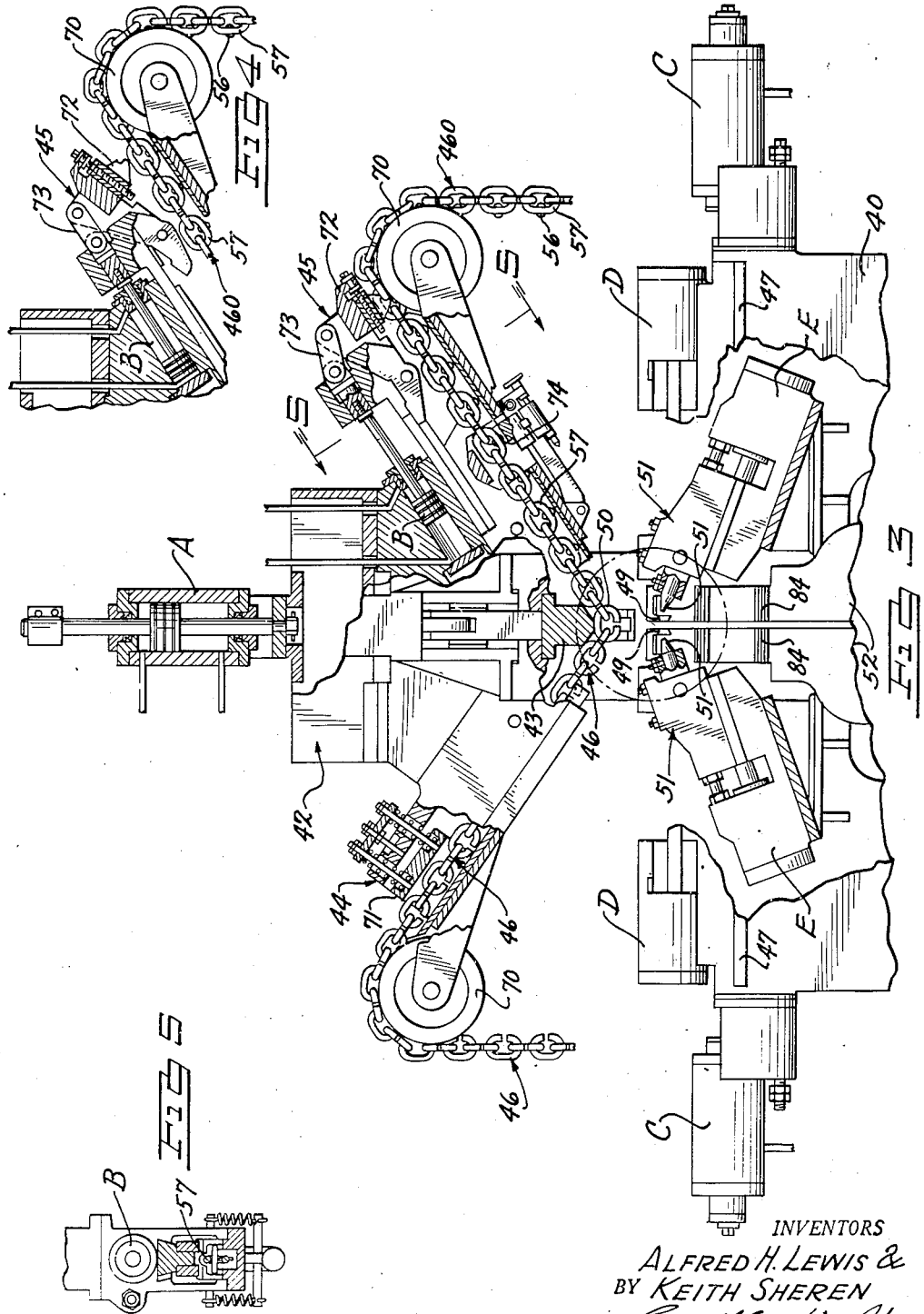

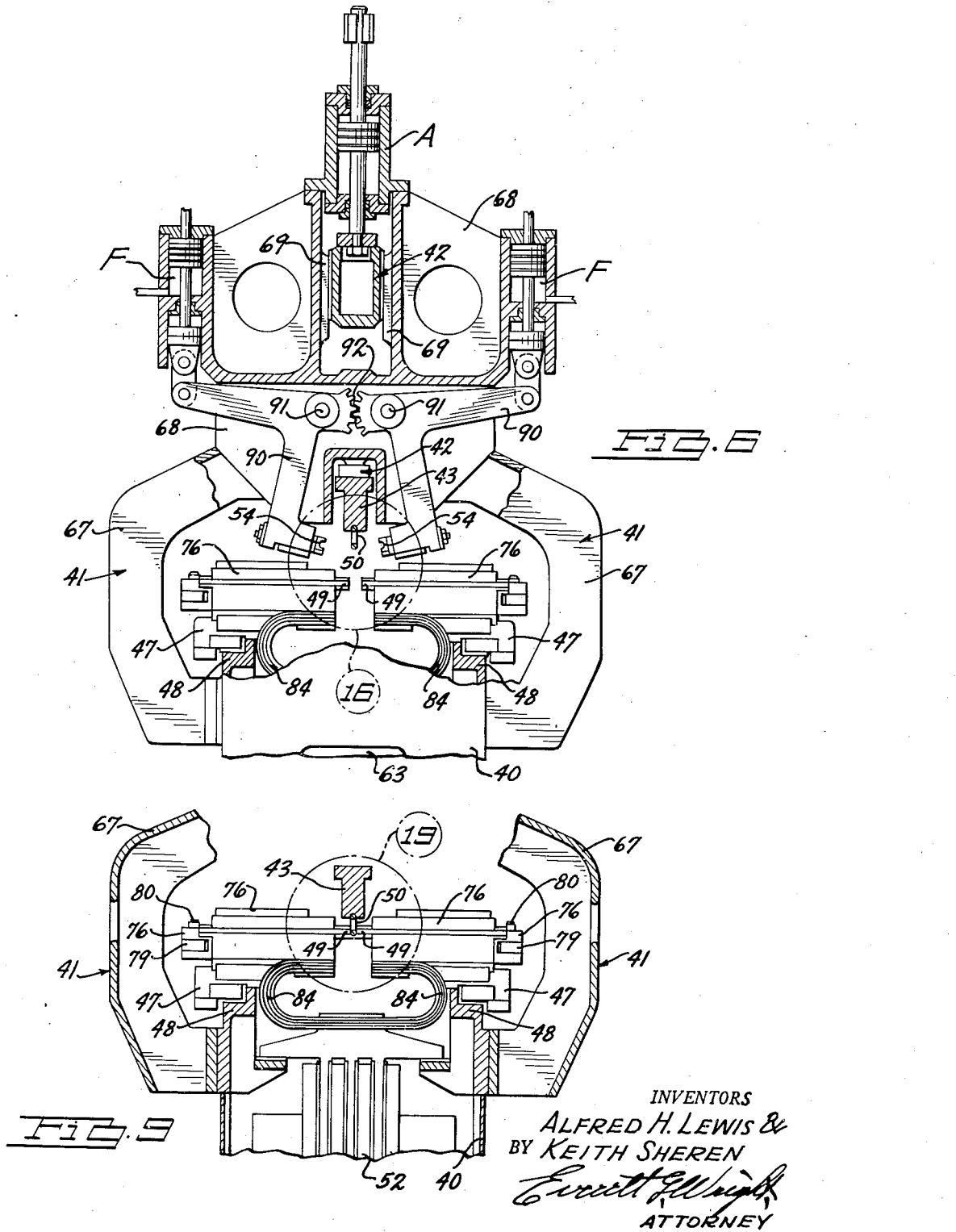

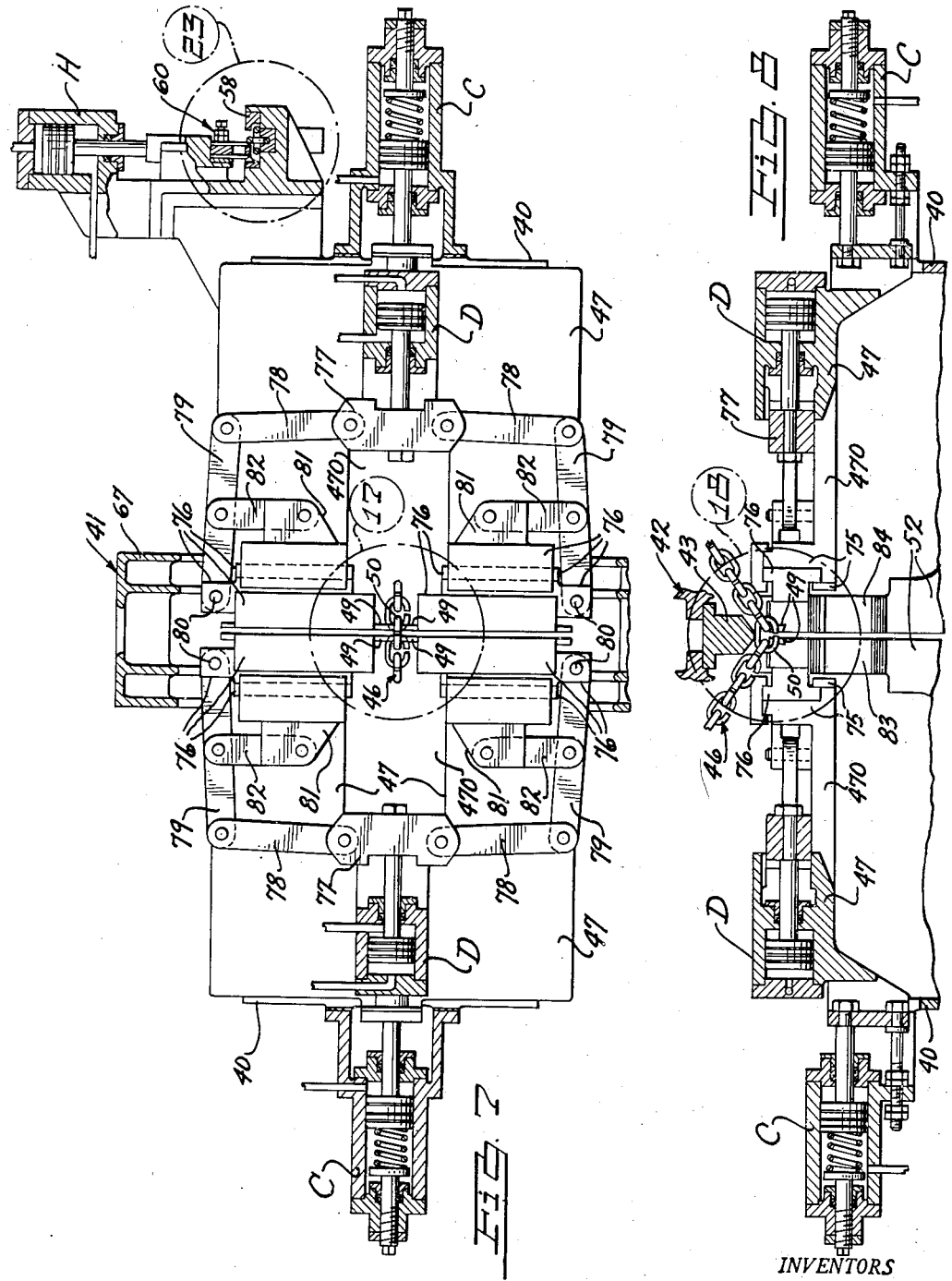

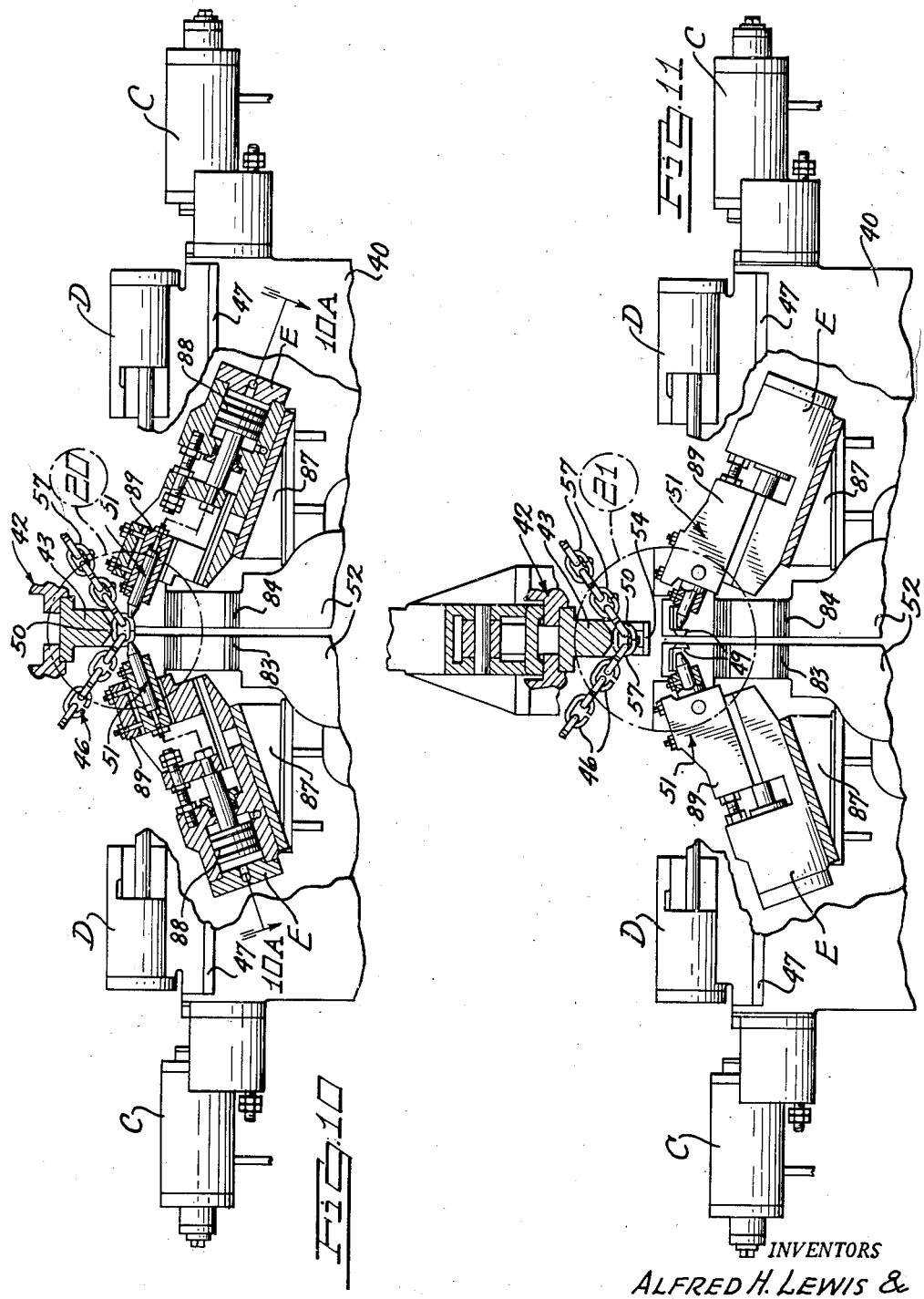

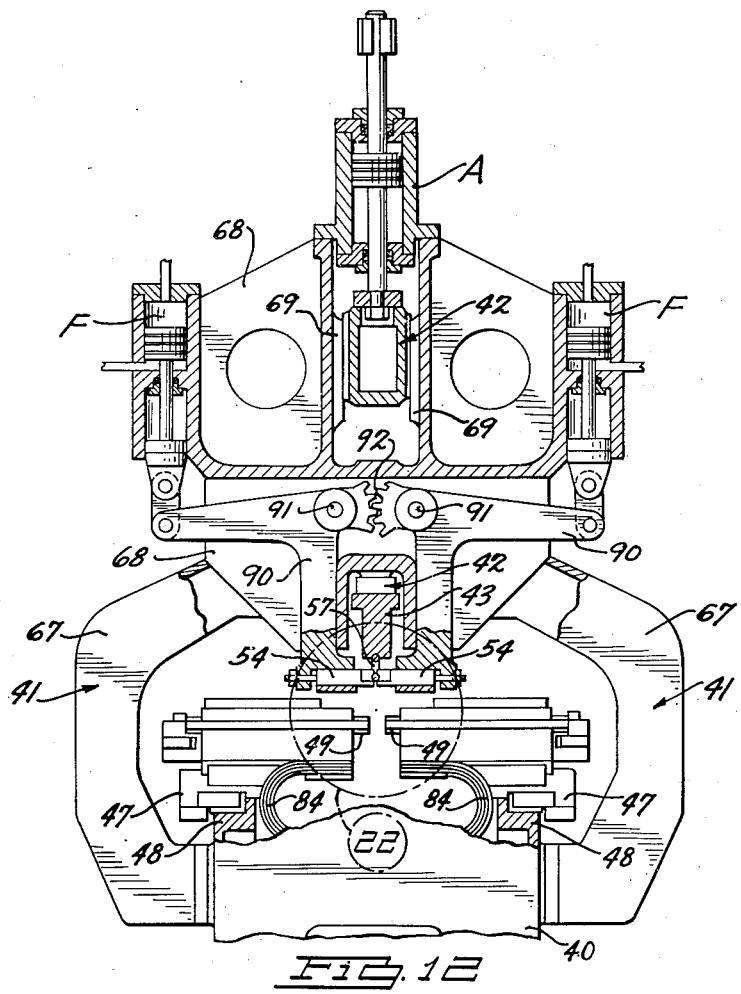
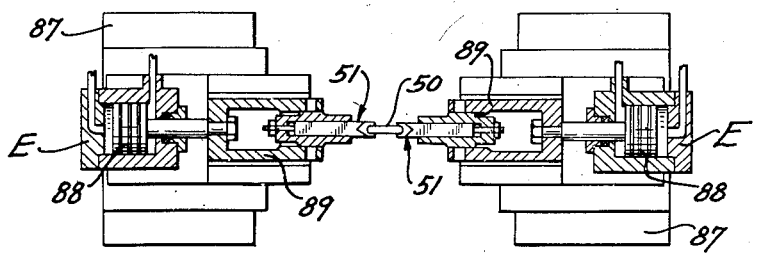

March 22, 1949. A. H. LEWIS ET AL 2,464,875
CHAIN WELDING AND CHAIN WELDING MACHINE
Filed March 21, 1947 9 Sheets-Sheet 7

INVENTORS
ALFRED H. LEWIS &
BY KEITH SHEREN
ATTORNEY

March 22, 1949.  A. H. LEWIS ET AL  2,464,875
CHAIN WELDING AND CHAIN WELDING MACHINE Filed March 21, 1947  9 Sheets-Sheet 8

INVENTORS
ALFRED H. LEWIS &
BY KEITH SHEREN
Everett H. Wright,
ATTORNEY

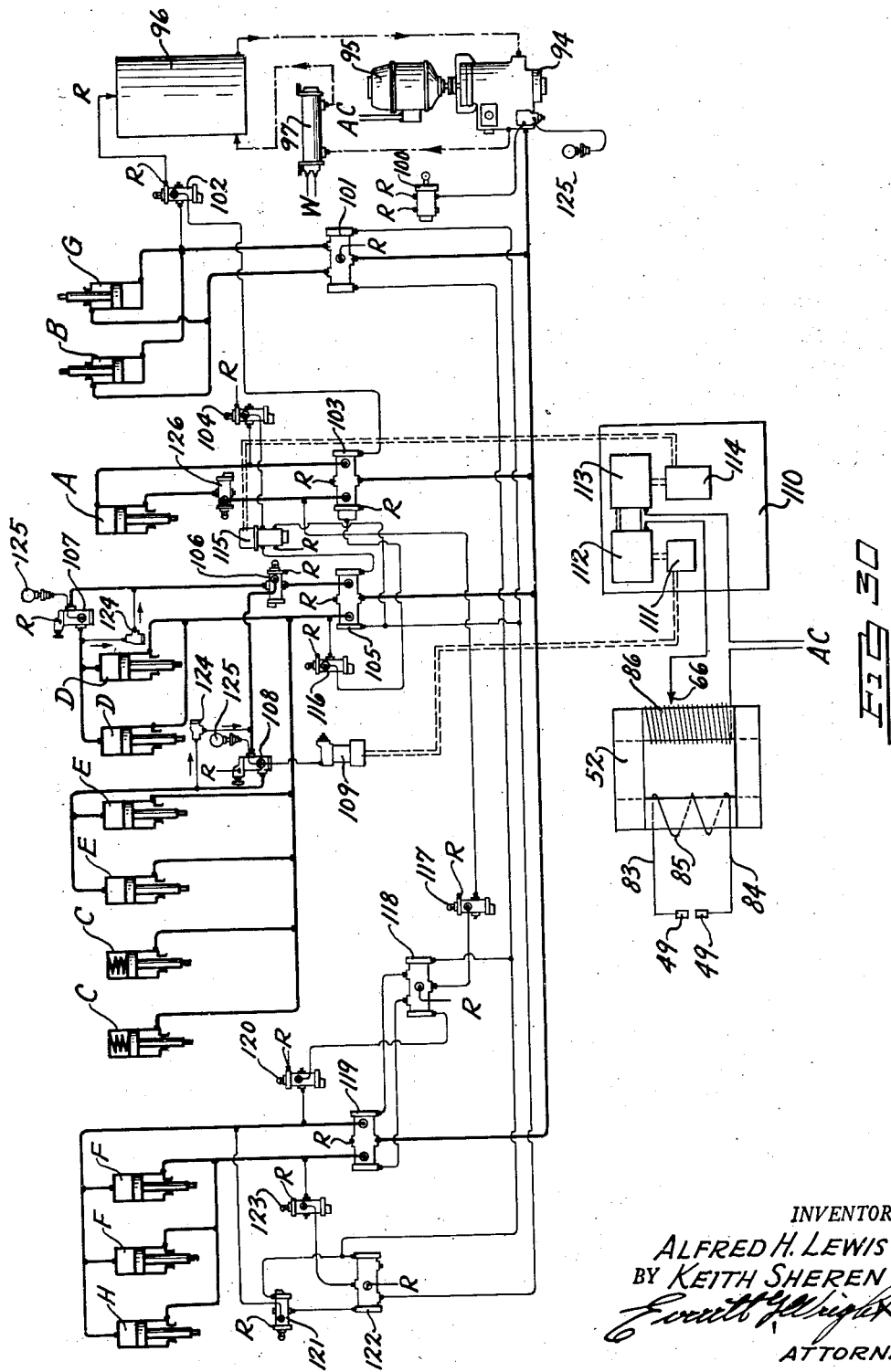

Patented Mar. 22, 1949

2,464,875

UNITED STATES PATENT OFFICE 2,464,875

CHAIN WELDING AND CHAIN WELDING MACHINE

Alfred H. Lewis, Huntington Woods, and Keith Sheren, Dearborn, Mich., assignors to Swift Electric Welder Company, a corporation of Michigan Application March 21, 1947, Serial No. 736,170

8 Claims. (Cl. 219—5)

1

This invention relates to improvements in chain welding and chain welding machines and in particular to electric chain welders employed to weld closed the links of chain already formed and substantially closed.

Heretofore, many methods of chain welding and various types of chain welding machines have been employed to weld closed the links of preformed chain. The prior art machines have been complicated and cumbersome, easy to get out of order or adjustment, and have been generally unreliable as regards the production of strong uniformly welded links at a rapid rate. Furthermore, weld trimming operations before swaging have been found to give unsatisfactory results, particularly in the welding of large diameter chain links, this because of the distortion of the crystaline structure of the welded link caused by loss of heat during the employment of a series of trimming and swaging operations.

With the foregoing in view, the primary object of this invention is to provide an improved method of chain welding and an improved chain welder which welds closed the links of preformed chain at a rapid rate which upsets the link at the weld, which maintains upset pressure momentarily after the weld is completed, which employs but a single weld swaging or coining operation, which trims after cooling of the weld, and which provides a finished chain of any given size having a maximum uniformity and strength.

A further object of the invention is to provide effective means for causing the electrodes of the improved chain welder to move with the closing ends of a link being welded, thus cutting down to a minimum the cooling time between the weld and upset and the coining operation and preventing movement of the link with respect to the electrodes during the upsetting and welding operation.

A further object of the invention is to provide in a chain welding machine a novel combination of elements and a sequential operation thereof whereby to accomplish the welding of links of preformed chain in a most effective manner with positive and uniform results.

Other objects of the invention will become apparent by reference to the following detailed description taken in connection with the accompanying drawings in which:

Fig. 1 is a front elevational view of a chain welding machine embodying the invention.

Fig. 2 is an end elevational view.

Fig. 3 is a fragmentary vertical sectional view taken substantially on the longitudinal center of

2 the welder disclosed in Fig. 1 showing the weld station of the welding machine with its operating head Up and an unwelded link transported to and held in the link guide ready to move down into welding position, the weld station chain transport mechanism being in its advanced "hold" position.

Fig. 4 is a fragmentary longitudinal sectional view showing the weld station chain transport mechanism in its retracted position about to be returned to its starting position preparatory to engagement with a link whereby to transport the chain passing through the welding machine and index another link in the link guide.

Fig. 5 is a transverse sectional view taken on the line 5—5 of Fig. 3 looking in the direction indicated by the arrows.

Fig. 6 is a fragmentary vertical sectional view of the chain welder taken at the weld station substantially on the transverse center line of the welder disclosed in Fig. 1 with the operating head Up and an unwelded link transported to and held in the link guide ready to be moved down into welding position.

Fig. 7 is a horizontal sectional view of the chain welder taken at the weld station with the operating head Down showing the electrodes applied to the chain link, the upper right hand portion of this figure showing the trim station of the welding machine with a welded link therein ready for trimming.

Fig. 8 is a fragmentary longitudinal sectional view of the welder taken at the weld station with the operating head Down showing the electrodes applied to the chain link positioned in the link guide.

Fig. 9 is a fragmentary transverse sectional view of the welder taken at the weld station with the head Down showing the electrodes applied to the chain link positioned in the link guide.

Fig. 10 is a fragmentary longitudinal sectional view of the welder taken at the weld station with the head Down showing the upsetting tools applied to the chain link positioned in the link guide.

Fig. 10A is a fragmentary exploded plan view taken on the line 1ºA—10A of Fig. 10.

Figs. 11 and 12 are fragmentary longitudinal and transverse sectional views of the welder taken at the weld station with the head Up showing the swaging anvils applied to and coining a completed weld.

Figure 14:
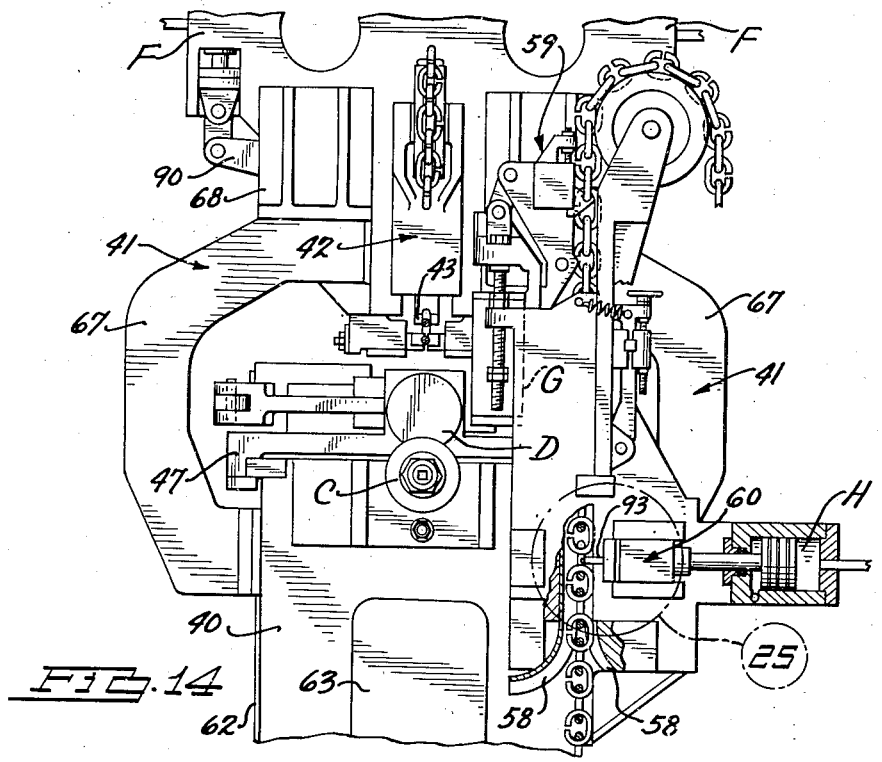
Figure 13:
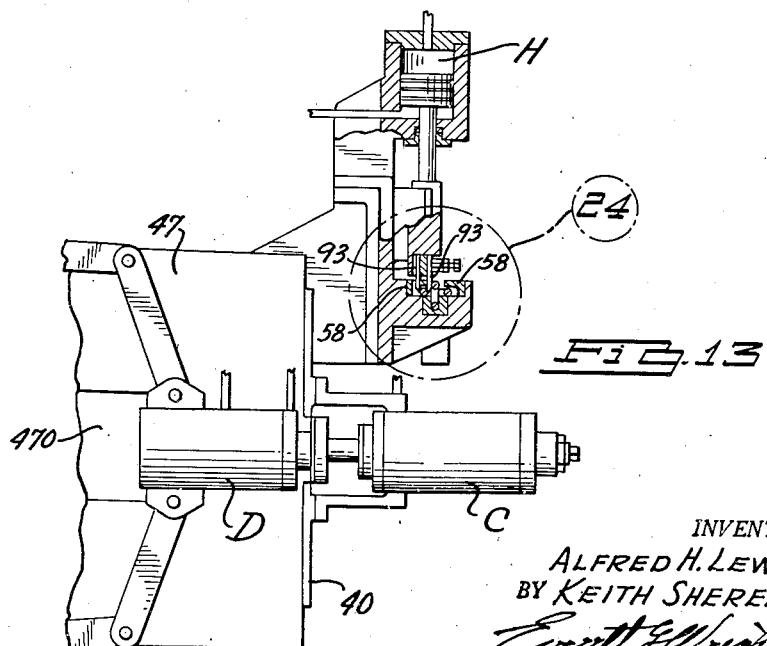
Figure 15:
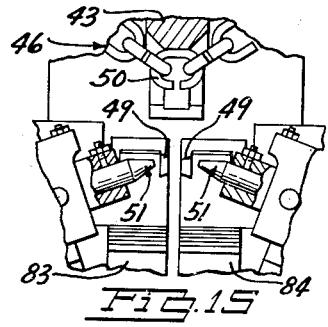
Figure 16:
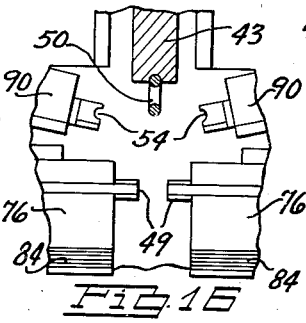
Figure 17:
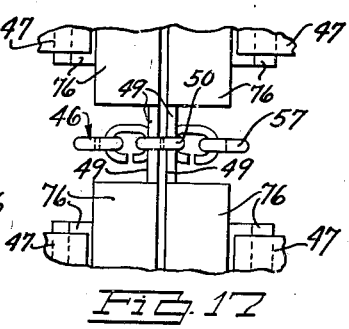
Figure 18:
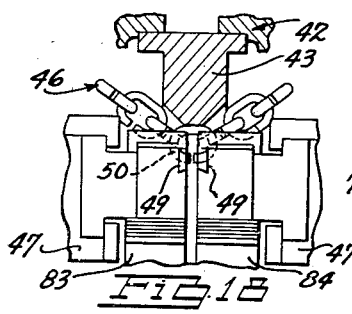
Figure 19:
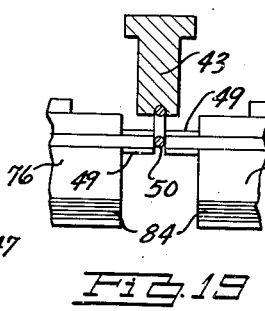

Figs. 13 and 14 are fragmentary plan and end views respectively of the chain welder taken at the trimming station with portions broken away showing the trimming station construction and trimming operation which preferably takes place simultaneously with the coining operation shown in Figs. 11 and 12.

Figs. 15, 16, 17, 18, 19, 20, 21 and 22 are enlarged fragmentary views taken within the dot and dash circles bearing such reference characters in Figs. 3, 6, 7, 8, 9, 10, 11 and 12 respectively showing sequential operating positions at the weld station of the welder.

Figure 23:
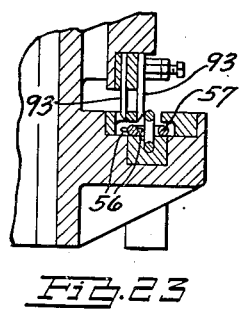
Figure 24:
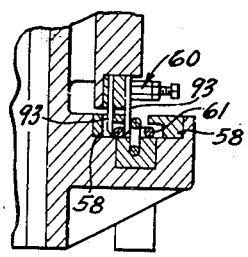
Figure 25:
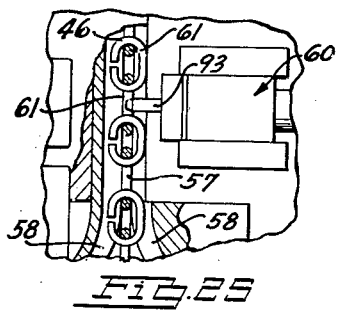
Figure 26:

Figs. 23, 24 and 25 are enlarged fragmentary views taken within the dot and dash circles bearing such reference characters in Figs. 8, 13 and 14 respectively showing sequential operating positions at the trim station of the welder.

Figs. 26, 27, 28 and 29 are enlarged views showing a chain link formed but not welded, welded and upset, coined, and trimmed respectively.

Fig. 30 is a combined hydraulic and electrical diagram illustrating a preferred arrangement of the hydraulic and electrical circuits employed.

Referring now to the drawings wherein like numerals refer to like and corresponding parts throughout the several views, the general construction of the improved chain welder and operating characteristics thereof will be described first followed by a more detailed description of the illustrative embodiment of the invention shown in the drawings. Although the chain welder disclosed is a single machine, it has two stations of operation; namely, a weld station and a trim station.

The particular welding machine shown in the drawings comprises, in general, combined base and transformer housing 40, a bridge 41 supported by and transversely spanning the said base 40, an operating head 42 supported by the said bridge 41 movable vertically with respect to the said base 40, a chain link guide 43 carried by the said operating head 42, weld station chain hold back mechanism 44 and weld station chain transport and indexing mechanism 45 carried by the said operating head and movable vertically with respect to the said base 40 together with the said chain link guide 43 (a chain 46 formed but not welded is shown in Fig. 3 threaded through the said weld station chain hold back mechanism 44, positioned in the said chain link guide 43 and threaded through and held taut by the weld station chain transport and indexing mechanism 45), a pair of platens 47 reciprocatingly mounted in longitudinal guides 48 on the base 40, pairs of electrodes 49 mounted on the platens 47 adapted to be advanced laterally against an unwelded link 50 of the chain 46 positioned in the unwelded chain link guide 43 of the operating head 42 when in its Down position and withdrawn therefrom after the welding and upsetting of the link 50, a pair of reciprocating upset anvils 51 supported by the base 40 adapted to engage the unwelded chain link 50 when positioned in the chain link guide 43 and close and upset the same (welding current from a transformer 52 disposed in the said base 40 is automatically applied responsive to the application of a predetermined upset anvil pressure, and after the weld is completed and upset is made, the welding current is automatically cut off and the welded and upset link 53 is held by the upset anvils 51 momentarily to cool), the said platens 47 carrying the electrodes 49 being adapted to travel with the closing welding and upsetting of the chain link 50, after the welding and upsetting of the chain link 50 the operating head 42 moves up and swaging tools 54 carried by the bridge 41 move in and swage or coin the weld upset 55 leaving oppositely disposed swage flashers 56 on the coined chain link 57, the welded, upset and coined chain links 57 are then transported to the trim station link guide 58 by trim station chain transport mechanism 59 where trim mechanism 60 trims the swage flashes 56 from the welded, upset and coined chain link 57 thereby producing a completed chain link 61. Figs. 26, 27, 28 and 29 show the unwelded chain link 50, the welded and upset chain link 53, the welded, upset and coined chain link 57, and the trimmed completed chain link 61 respectively. Each of the said welding machine elements is preferably actuated hydraulically, mechanically, and/or electrically in combination and sequence as hereinafter more fully described in detail and preferably as indicated but not limited to the means shown in the drawings and in the combined hydraulic and electric diagram shown in Fig. 30.

The chain welder embodying the invention welds alternate chain links and functions in the following cycle:

*Start position.*—An unwelded chain link 50 is indexed in the link guide 43 at weld station and a coined chain link 57 is indexed in the link guide 58 at trim station. Electrodes 49, platens 47, upset anvils 51, swaging tools 54, and trim mechanism 60 are retracted. Operating head 42 is Up.

*No. 1 operation.*—Operating head 42 moves Down.

*No. 2 operation.*—Electrodes 49 move into lateral pressure contact with the unwelded link 50 near the open ends thereof.

*No. 3 operation.*—(a) Platen retracting pressure is cut off and platens 47 are made free to travel under spring pressure with the closing and the upsetting of the unwelded link 50 during the welding thereof.

(b) Upset anvils 51 are brought into contact with the unwelded link 50 and upset pressure is applied.

(c) Welding current is applied responsive to predetermined upset anvil pressure.

(d) Weld upset is accomplished during welding, the weld is completed, and the welding current is cut off responsive to a suitable welding current timing mechanism.

(e) The welded and upset link 53 is allowed to cool momentarily while held by the upset anvils 51 under upset pressure.

*No. 4 operation.*—Upset anvils 51, electrodes 49 and platens 47 are retracted, and the head 42 moves Up.

*No. 5 operation.*—Swaging tools 54 move in and coin the weld upset 55 at the weld station while swage flashes 56 are trimmed from a previously welded, upset and coined chain link 57 by trim mechanism 60 at the trim station.

*No. 6 operation.*—Swaging tools 54 and trim mechanism 60 are retracted and chain transport mechanism 45 and 59 at the weld station and trim station respectively advance and index the second succeeding links of unwelded chain 50 and welded, upset and coined chain 57 respectively; and the welding machine is again at the Start position of its cycle.

The combined base and transformer housing 40 is preferably of cast iron or steel construction having side and end access panels 62 and 63 and bearing plates 64 as indicated in Figs. 1 and 2. Transformer switch arms 65 and 66 extend through the left end access panel 63 as viewed in Fig. 1. The bridge 41 is preferably composed of side bridge arms 67 and a bridge head 68 having guides 69 onto which the operating head 42 slides vertically. The said operating head 42 carrying chain sheaves 70, the chain link guide 43, weld station chain hold back mechanism 44, and weld station chain transport and index mechanism 45 is moved vertically Up and Down by the operating head hydraulic cylinder A mounted on the bridge head 68 of the bridge 41.

Between the said chain sheaves 70 carried by the operating head 42 is disposed the weld station chain hold back mechanism 44, the chain link guide 43 and the weld station chain transport and index mechanism 45 which are viewed in the order just named from left to right in Fig. 3. The weld station chain hold back mechanism 44 is preferably composed of a pair of laterally spaced spring loaded shoes 71 which engage the transversely disposed links of the formed but not welded chain 46. The chain link guide 43 carried centrally in the operating head 42 is suitably grooved to hold an unwelded link 50 of the formed but not welded chain 46 longitudinally of the welding machine. The weld station chain transport and index mechanism 45 also carried by the said operating head 42 is disposed between the chain link guide 43 and the right hand chain sheave 70 as viewed in Fig. 3. The chain transport and index mechanism 45 is preferably composed of a reciprocating dog 72 pivotally mounted on linkage 73 connected to and actuated by a chain transport hydraulic cylinder B. The said reciprocating dog 72 is shown in its advanced position in Fig. 3 holding the unwelded chain 46 and partially welded chain 460 taut between the weld station chain transport mechanism 45 with an unwelded link 50 indexed in the chain guide 43. When the said reciprocating dog 72 is retracted, it moves back a distance of two links of the partially welded chain 460 and engages the second link back and moves it forward on the forward stroke of the said chain transport hydraulic cylinder B. A spring loaded hold dog 74 engages the partially welded chain 460 and prevents its accidental movement toward the chain guide 43 when the said reciprocating chain dog 72 is on its return stroke. The heel of the said hold dog 74 is so shaped as to cause the transversely disposed links of the partially welded chain 460 to depress the said hold dog out of position as the said chain 46 and 460 is being transported by the said weld station chain transport and index mechanism 45 in the process of indexing the second next link in the chain link guide 43 after the welding, coining and upset operations on an unwelded link 50 have been accomplished. Obviously other means for transporting and indexing the chain to be welded may be employed; for example, the entire chain transport and indexing mechanism may be reversed so that the reciprocating dog 72 is disposed more nearly adjacent the chain link guide 43. The latter has an advantage where there is any material variation in the dimensions of the unwelded links whereby to assure more accurate indexing of the unwelded links 50 in the chain link guide 43.

When the operating head 42 is moved from its Up position to its Down position, the unwelded chain link 50 positioned in the chain link guide 43 is brought into lateral alignment with the electrodes 49 mounted on the platens 30 and within operating contact of the upset anvils mounted on the base 40 of the chain welder. When the operating head is moved from its Down position to its Up position, the welded and upset link 53 in the link guide 43 is brought into lateral alignment with the swaging tools 54.

Referring now particularly to Figs. 7, 8 and 9, the platens 47 are each mounted for longitudinal reciprocating movement with respect to the base 40 on suitable longitudinal guides 48. Spring loaded platen retracting hydraulic cylinders C mounted on each end of the base 40 have their pistons connected to the platens 47 which are normally urged thereby to travel under spring pressure toward the center of the welder. Hydraulic pressure applied to the pistons of the spring loaded platen retracting hydraulic cylinders C compresses the springs therein and retracts the platens 47 connected thereto. When the pressure in the said platen retracting hydraulic cylinders C is relieved, the platens 47 are free to move toward the center of the chain welder under the pressure of the compressed springs in the said hydraulic cylinders C.

Each platen 47 is provided with a pair of transverse guides 75 upon each of which an electrode slide 76 is mounted to move transversely of the platen toward and away from the longitudinal center thereof. Each of the electrode slides 76 carry an electrode 49 which is carried on its inner end to contact one side of an unwelded link 50 positioned in the chain link guide 43. With the illustrated arrangement of a pair of oppositely disposed electrodes 49 on each platen 47, electrodes 49 may be brought into contact with the opposite sides of an unwelded chain link 50 on each side of the opening in the said unwelded chain link 50. This is accomplished by a system of levers actuated by electrode operating hydraulic cylinders D as best shown in Figs. 7 and 8. Each platen 47 has an electrode operating hydraulic cylinder D mounted on the outer end thereof and carried thereby. Onto the end of the piston rod of the said electrode operating hydraulic cylinder D is fixed a transversely disposed fixed head 77 to which is pivoted transversely disposed links 78. Longitudinally disposed arms 79 are pivotally connected at one end to the outer end of each of the said transversely disposed links 78, and the other end of each of the said longitudinally disposed arms 79 are connected to fixed anchorage pivots 80 at the laterally outer end of each electrode slide 76.

Each platen 47 is provided with a pair of suitable lugs 81 to which is pivotally connected a transverse link 82 which in turn is pivotally connected to the longitudinally disposed links 79 midway between the ends thereof. This linkage construction moves the electrodes 49 into contact with the unwelded chain link 50 positioned in the chain link guide 43; and, since the electrode advance mechanism and electrodes 49 are carried by the platens 47, the electrodes 49 travel with the closing, welding and upsetting of the unwelded chain link 50 during the welding operation. The electrodes 49 are connected by the flexible electrical conductors 83 and 84 to the secondary 85 of the transformer 52, the primary 66 of which is connected through suitable pressure responsive timing mechanism to a source of alternating current "A. C."

Figure 20:
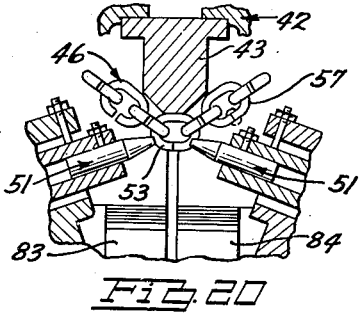
Figure 21:
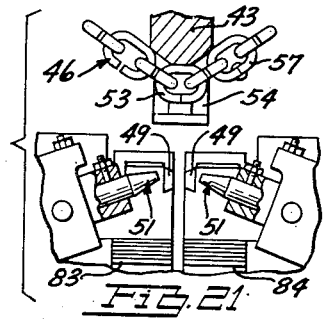
Figure 22:
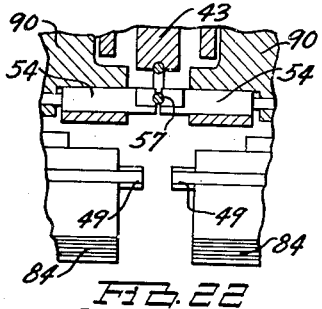

Before welding current is applied through the electrodes 49 to an unwelded chain link 50 disposed in the chain link guide 43, upset anvils 51 apply pressure to the said chain link 50 and close the same whereupon welding current is applied responsive to predetermined upset anvil pressure and is cut off responsive to suitable welding current timing mechanism. After the welding current is cut off, the upset anvils 51 continue momentarily to apply upset pressure to the welded and upset link 53 after which the upset pressure is relieved and the upset anvils 51 are retracted. The two upset anvils 51 are preferably mounted in oppositely disposed inclined relationship on suitable brackets 87 welded or otherwise secured to the base 40. The platens 47 are suitably notched at 470 as indicated in Figs. 7 and 8 to accommodate and bypass the said upset anvils 51 not shown in the said Figs. 7 and 8. By referring to Figs. 10, 10A and 11, a preferred construction of the upset anvils 51 is shown. Each upset anvil 51 comprises an upset anvil operating hydraulic cylinder E mounted on the bracket 87 having its piston 88 connected to an anvil carrying slide 89 onto which is mounted an anvil 51 shaped to engage an unwelded chain link 50 and close the same as indicated in Figs. 10, 10A and 20 causing the upsetting of the welded link 53 as indicated in Fig. 27.

Figure 27:
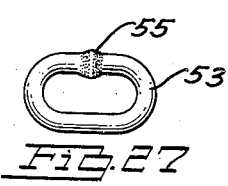
Figure 28:
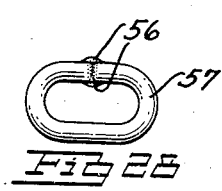
Figure 29:
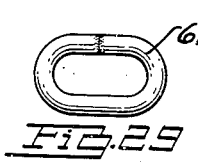

After the unwelded chain link 50 is welded and upset as indicated in Fig. 27, the upset anvils 51, electrodes 49 and platens 47 retract, and the head 42 is moved Up by the operating head hydraulic cylinder A to the position shown in Figs. 11 and 12 whereupon swaging tools 54 mounted on crank arms 90 pivoted on the bridge head 68 by pivots 91 and geared together at 92 are brought by means of swaging hydraulic cylinders F into swaging contact with the welded and upset chain link 53 at the weld upset 55, thus coining the upset 55 and leaving swage flashes 56 on the welded, upset and coined chain link 57, see Figs. 27 and 28. The swaging hydraulic cylinders F then retract the swaging tools 54 and the chain transport mechanism 45 at the weld station advances another unwelded link 50 to the chain link guide 43

While the unwelded link 50 is being welded, upset and swaged at the weld station, welded chain 460 is transported by trim station chain transport mechanism 59 to the trim mechanism 60. The trim station chain transport mechanism 59 is like and similar to the weld station transport mechanism 44 except that it is preferably vertically disposed, is operated by the trim station chain transport hydraulic cylinder G and transports welded chain 460 through the trim station link guide 58 wherein the swage flashes 56 are trimmed off the coined chain links 57 by trim tools 93 operated by the trim shear hydraulic cylinder H as best shown in Figs. 13, 14, 23, and 25. The trimming operation at the trim station preferably is carried on simultaneously with the swaging operation at the weld station and the chain transport at both the weld station and the trim station is preferably accomplished simultaneously.

Referring now particularly to Fig. 30, the illustrative embodiment of the invention disclosed in the drawings may be operated automatically after opening the Start-stop valve 100 by the combined hydraulic-electric controls indicated in the said Fig. 30. Obviously, other means for providing automatic sequential operation of the various elements of the welding machine may be employed to accomplish the desired results.

Before opening the said Start-stop valve 100, the pump 94 is started by supplying AC current to the pump motor 95 from a starting switch, not shown. When the pump 94 is running and the welder is not operating, fluid from the fluid reservoir 96 is circulated by the pump 94 from the said reservoir 96 through the pump 94, through the cooler 97 back to the reservoir 96 through the cooler 97 back to the reservoir 96 as indicated by the dot and dash lines in Fig. 30.

When the Start-stop valve 100 is opened, hydraulic fluid under pressure builds up in the hydraulic-electric control system and, at the start of a cycle of operation of the welder, a directional control valve 101 operates cylinder B to index unwelded chain 46 at the weld station and operates cylinder to index welded chain 460 at the trim station, whereupon a sequences valve 102 initiates a directional control valve 103.

The directional control valve 103 then operates cylinder A to move the operating head 42 Down whereupon sequence valve 104 initiates a directional control valve 105.

The directional control valve 105 then operates a sequence and check valve 106 which in turn operates cylinders D and then operates cylinders E through pressure control valves 107 and 108 to move electrodes 49 into contact with an unwelded link 50 and then apply upset pressure through the upset anvils 51 thereto; the said directional control valve 105 also functioning to relieve platen retracting pressure in cylinder C.

When the pressure in upset cylinders E builds up to a predetermined or preset pressure at the anvils 51 then a hydraulic pressure switch 109 initiates an electrical control panel 110 which functions to close the welding circuit to the electrodes 49 through a relay 111 and initiates a timer 112 which times and cuts off welding current and simultaneously initiates a second timer 113 which regulates the cooling time during which the weld continues to be subjected to upset pressure from the said anvils 51. A time relay 114 then energizes a solenoid operated directional control hydraulic valve 115.

The said solenoid operated directional control hydraulic valve 115 then initiates the directional control valve 105 which in turn operates cylinders D to retract electrodes 49, operates cylinders E to retract upset anvils 51, and operates cylinders C to retract the platens 47 whereupon a sequence valve 116 initiates the directional control valve 103 which then operates cylinder A to move head 42 up and supplies pressure to a sequence valve 117 which in turn supplies pressure to a directional control valve 118.

The said solenoid operated directional control hydraulic valve 115 also initiates the directional control valve 118 which in turn initiates another directional control valve 119 which operates cylinders F and cylinder H to swage the welded and upset chain link 53 at the weld station and to trim the welded, upset and coined chain link 57 at the trim station respectively, whereupon a sequence valve 120 initiates the directional control valve 118 which in turn initiates the directional control valve 119 which operates cylinders F and cylinder H to return the swage tools 54 and the trim tools 93 respectively to their retracted position.

During the operation of the sequence valve 120, a sequence valve 121 initiates a directional control valve 122 which in turn initiates the directional control valve 101 which then operates index cylinders B and G to retract the index weld station chain transport and index 45 and the trim station chain transport and index mechanism 59 while the time relay 114 at the control panel 110 simultaneously de-energizes the solenoid operated directional control valve 115. During the operation of cylinders F and the cylinder H responsive to the directional control valve 119, a sequence valve 123 furnishes pressure to the directional control valve 122 which initiates the directional control valve 101 and restarts cycle.

Directional check valves 124, pressure gages 125 and a counterbalance valve 126 are employed in the hydraulic system as indicated in Fig. 30. The reference character R throughout Fig. 30 indicates return lines to the hydraulic fluid reservoir 96. The closing of the Start-stop valve 100 at any time stops the operation of the welder at the then stage of its cycle of operation, and the subsequent opening of the said Start-stop valve 100 again starts the welder in operation from the stage of the cycle of operation at which it had been stopped.

Although but a single embodiment of the invention has been shown and described in detail, it is obvious that many changes may be made in size, shape, arrangement and detail of the various elements of the invention without departing from the spirit and scope thereof as defined by the appended claims.

We claim:

1. In a machine for welding closed partially open links of preformed chain comprising a base, a bridge over said base, an operating head carried by said bridge vertically movable with respect thereto composed of a link guide and means for indexing and holding unwelded links in the said link guide with the open side of said links in central depending relationship with respect to the said link guide, platens reciprocatingly mounted on said base resiliently urged to a position in near abutment under the longitudinal center of the said link guide, electrodes carried by the said platens formed to engage unwelded chain links each side of the opening thereof, a pair of upset anvils mounted in the said base formed to engage and close the unwelded link during the application of welding current thereto, swaging tools carried by said bridge disposed above the said electrodes formed to engage and swage a newly formed weld, means for sequentially indexing and holding an unwelded link in the chain guide, means for moving the head Down, means for retracting the said platens and holding the same in their retracted position, means for applying the said electrodes to the chain link to be welded, means for releasing the platens, means for applying the welding current, means for moving the upset anvils against the unwelded link during the application of welding current thereto whereby to upset the link at the weld during welding, means for cutting off the welding current, means for holding the welded and upset link under upset pressure momentarily after welding current is removed, means for moving the head Up, and means for applying the said swaging tools to the link whereby to coin the welded and upset portion of the link.

2. In a welding machine for welding closed alternate partially open links of preformed chain and swaging the same, an operating head including a central link guide formed to receive a link to be welded with the open side of the link in central depending relationship with respect thereto, chain sheaves spaced longitudinally of and above the said link guide at each end thereof, chain hold-back mechanism composed of a pair of spring loaded shoes frictionally engaging horizontally disposed links intermediate links to be welded located between one sheave and the said link guide, and chain advance mechanism composed of a reciprocating advance dog and a holding dog engaging the chain during the return movement of the advance dog located between the said link guide and the other sheave, the said operating head being movable Up and Down whereby to carry a chain link disposed in the said link guide into and out of welding position and into swaging position.

3. In a welding machine for welding closed partially open links of preformed chain and swaging the same, an operating head composed of a link guide grooved to hold unwelded links therein in a vertical position with the open side of said links in central depending relationship with respect to the said link guide, chain sheaves spaced longitudinally of and above said link guide at each side thereof formed to support chain by links alternate and normal to links to be welded, spring loaded frictional chain hold-back mechanism adapted to engage said alternate links located between one sheave and the said link guide, and intermittently movable reciprocating chain advance mechanism including an advance dog adapted to engage said alternate links between the said link guide and the other sheave and move the next vertically disposed unwelded chain link into welding position in the said link guide and a hold dog to hold the chain during the return of the advance dog, the said operating head being movable Up and Down whereby to carry a chain link disposed in the said link guide into and out of welding position and into swaging position.

4. In a welding machine for welding closed partially open links of preformed chain, an operating head including a link guide adapted to index and hold links to be welded therein, a pair of platens each reciprocatingly mounted for movement longitudinally with respect to the center of the said link guide spring loaded to a normal position in near abutment at the longitudinal center of the said link guide, means for retracting the said platens, electrodes mounted on said platens adapted to engage a link disposed in the said link guide on each side of the opening therein, means for closing the said chain link during the welding thereof, and means for releasing the said platen retracting means whereby to permit the platens and the electrodes carried thereby to move with the chain link during the closing and welding thereof.

5. In a machine for welding closed partially open links of preformed chain comprising a base, a weld station and a trim station, at the weld station, a bridge over said base, an operating head carried by said bridge vertically movable with respect thereto composed of a link guide and means for indexing and holding unwelded links in the said link guide with the open side of said links in central depending relationship with respect to the said link guide, platens reciprocatingly mounted on said base, including means for resiliently urging the same to a position in near abutment under the longitudinal center of the said link guide, electrodes carried by the said platens, means for moving the said electrodes in engagement with unwelded chain links each side of the opening thereof, a pair of upset anvils reciprocatingly mounted in the said base, means for advancing the said anvils against the unwelded link to engage and close the unwelded link during the application of welding current thereto, swaging tools carried by said bridge disposed above the said electrodes, means for moving the said swaging tools into engagement with and swage a newly formed weld, and means for sequentially indexing and holding an unwelded link in the chain guide, moving the head Down, retracting the said platens and holding the same in their retracted position, applying the said electrodes to the chain link to be welded, releasing the platens, applying the welding current, advancing the anvils to apply upset pressure on the link at the weld during welding, cutting off the welding current, maintaining the anvils against the welded and upset link under upset pressure momentarily after welding current is removed, moving the head Up, and moving the swaging tools against the welded and upset portion of the link whereby to coin the weld, the said coined welded link having a pair of swage flashes thereon, and means for transporting the said welded and coined links from the weld station to and indexing them at said trim station, and at the trim station means for trimming the swage flashes from the said coined welded links.

6. The method of welding closed partially open links of preformed chain comprising the steps of holding a link to be welded against movement, applying electrodes under lateral pressure to the said link adjacent each side of the opening therein, applying welding current and simultaneously closing said link while carrying the electrodes with the link as the opening therein is closed whereby to weld the closed ends of the link together without distortion of the link due to electrode pressure thereon, and then applying upset pressure longitudinally of the said link whereby to upset the said weld, cutting off the welding current, and holding the said welded upset link under upset pressure momentarily, and then coining the weld while still hot.

7. A machine for welding closed partially open links of preformed chain comprising means for holding a link to be welded against movement, means for applying electrodes to the said link each side of the opening therein, means for applying welding current to the said link through the said electrodes and simultaneously closing said link whereby to weld the closed ends of the link together, means for applying upset pressure longitudinally of the said link whereby to upset the said weld, means for moving the said electrodes with the said link as the opening therein is closed and the weld is upset, means for cutting off the welding current and holding the said welded upset link under upset pressure momentarily, and means for coining the weld while still hot.

8. In a welding machine for welding closed partially open links of preformed chain, an operating head including a link guide adapted to index and hold links to be welded therein, a pair of platens each reciprocatingly mounted for movement longitudinally with respect to the center of the said link guide spring loaded to a normal position in near abutment at the longitudinal center of the said link guide, means for retracting the said platens, electrodes mounted on said platens adapted to engage a link disposed in the said link guide on each side of the opening therein, means for closing the said chain link during the welding thereof, means for releasing the said platen retracting means whereby to permit the platens and the electrodes carried thereby to move with the chain link during the closing and welding thereof, and means for swaging the newly formed weld.

ALFRED H. LEWIS.
KEITH SHEREN.

REFERENCES CITED

The following references are of record in the file of this patent:

UNITED STATES PATENTS

| Number | Name | Date |
|---|---|---|
| 728,119 | Levenberger | May 12, 1903 |
| 783,543 | Rietzel | Feb. 28, 1905 |
| 1,023,129 | Ryan | Apr. 16, 1912 |
| 1,474,824 | Hoff | Nov. 20, 1923 |
| 1,688,883 | Senft | Oct. 23, 1928 |
| 1,980,935 | Stahl | Nov. 13, 1934 |
| 2,288,494 | Speed et al. | June 30, 1942 |
| 2,301,173 | Blum et al. | Nov. 10, 1942 |